United States Patent [19]
Palmenberg

[11] 3,778,906
[45] Dec. 18, 1973

[54] BUTTRESS TWIST GAGE

[75] Inventor: Edward C. Palmenberg, Nanuet, N.Y.

[73] Assignee: Chromalloy American Corporation, Orangeburg, N.Y.

[22] Filed: Dec. 29, 1971

[21] Appl. No.: 213,577

Related U.S. Application Data

[62] Division of Ser. No. 25,506, April 3, 1970.

[52] U.S. Cl. .............................................. 33/174 P
[51] Int. Cl. .............................................. G01b 5/20
[58] Field of Search ...................... 33/174 G, 174 P, 33/174 PA, 174 PB, 174 C

[56] References Cited
UNITED STATES PATENTS

| | | | |
|---|---|---|---|
| 3,102,344 | 9/1963 | Herman | 33/174 PA |
| 3,678,585 | 7/1972 | Dabrush et al. | 33/174 PA |
| 3,639,992 | 2/1972 | Dabrush et al. | 33/174 PA |
| 3,464,119 | 9/1969 | Griggs | 33/174 C |

FOREIGN PATENTS OR APPLICATIONS 693,023  6/1953  Great Britain ........................ 33/174

Primary Examiner—Stanley N. Gilreath
Assistant Examiner—Jon W. Henry
Attorney—Sandoe, Hopgood and Calimafde

[57] ABSTRACT

The invention contemplates a vane-twist measuring or gaging instrument in which the overall twist of the vane is assumed to be indicated by the angular relation between a reference alignment, taken on one buttress surface, and a measured-offset alignment, taken on the corresponding surface of the other buttress for the same vane. Basically, a reference plane is established for the reference surface of the first abutment, as by using two fixed and precisely positioned spaced point-contact elements, and a gage carried by the instrument near the other buttress senses the inclination of the other buttress (with respect to the reference plane) when the other buttress is applied against a single, or third, fixed point of support on the instrument. In one form, the third support point is established by an elongated bar, with provision for central pivotal support, so that its angular orientation about the pivot may reflect contact with, and therefore slope of, the other vane buttress; in another form, the third support point is a fixed abutment near one end of the other buttress, and a probe responds to a given location near the other end of the buttress when the vane is applied to the three fixed support contacts.

5 Claims, 7 Drawing Figures

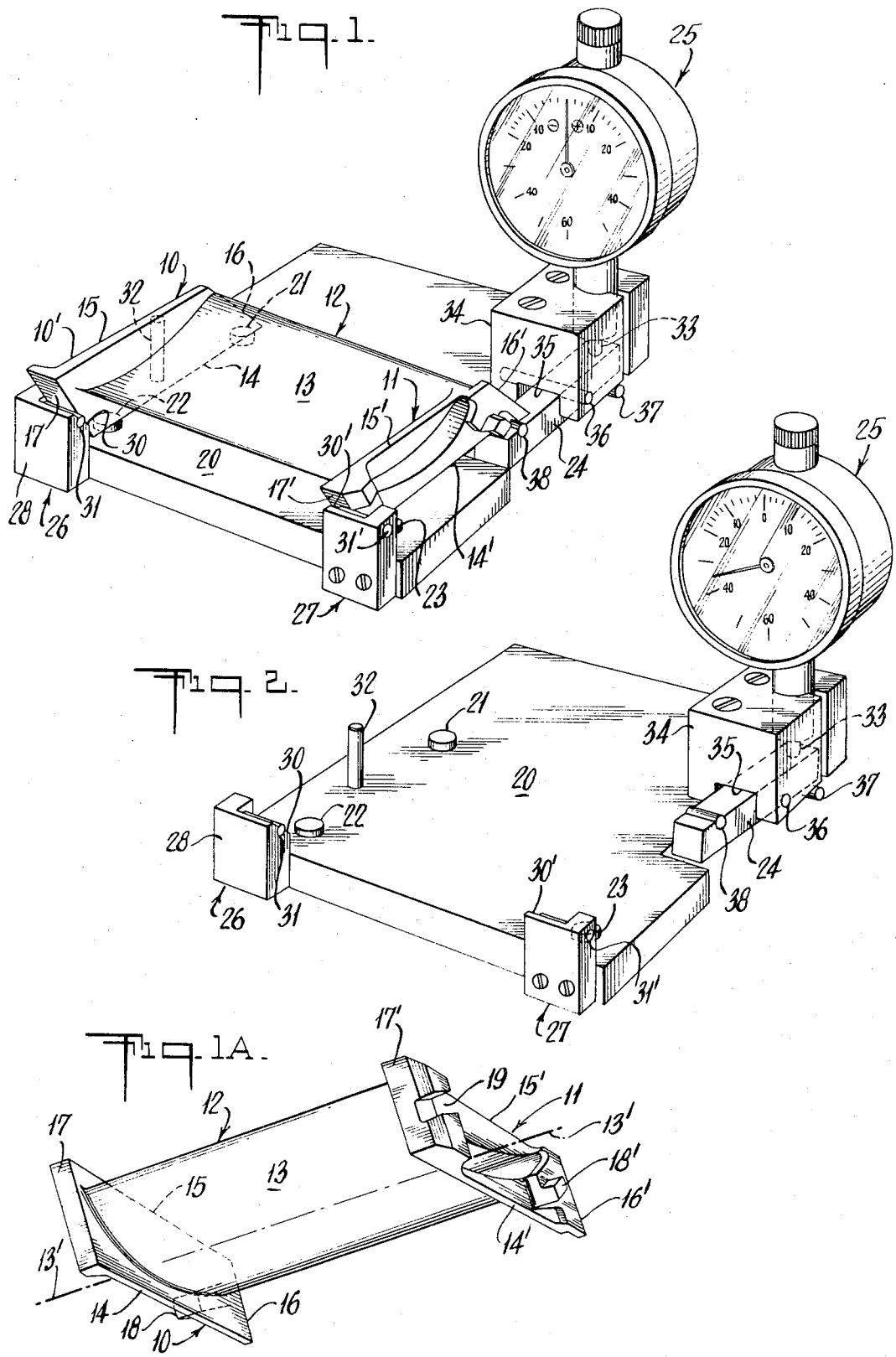

BUTTRESS TWIST GAGE

This application is a division of my copending application, Ser. No. 25,506, filed Apr. 3, 1970.

This invention relates to gaging and measuring devices for observing adherence to one of several dimensional factors critical to the performance of vanes in a turbine, such as the gas turbine of a jet aircraft.

Turbine-engine nozzle guide vanes or blades are subjected to rapid extremes of temperature and differential-pressure loading, and as a result the individual parts comprising a nozzle assembly become bent and otherwise distorted. Moreover, vanes which have seen service conditions, with accompanying deformation, are often repaired and re-configured by a hot-forming technique, and unless extreme care is exercised, this process can be another source of introducing angular deformation between the mounting surfaces of the outer and inner buttresses of the guide vane.

Such departures from "new" part dimensions prevent proper fitting of the vane into the support mechanism or shroud assembly; they also create a false angle of attack by the vane airfoil section or blade. Both these conditions are unsuitable for proper engine performance.

The deformations and distortions which are deleterious to engine performance include others beyond the overall-twist factor noted above. But I have discovered that buttress-to-buttress twist in a turbine vane is a single factor of critical importance, and the present invention is particularly concerned with the gaging and measurement of this factor.

It is accordingly an object of the invention to provide means for measuring or gaging twist, or departures from desired twist, in vane structures of the character indicated.

Another object is to achieve the above object with a device which, for a given vane configuration, is sensitive essentially only and critically to the twist factor.

It is a specific object to achieve the foregoing with basically simple structure which lends itself to reliable use by relatively unskilled personnel and which enables the accurate checking of every vane element, before and after reconditioning.

Another specific object is to provide instrumentation to achieve the foregoing and having the inherent capability of assuring products which, insofar as the twist factor is concerned, equal or exceed the consistency and quality of newly manufactured vanes.

Other objects and various further features of novelty and invention will be pointed out or will occur to those skilled in the art from a reading of the following specification, in conjunction with the accompanying drawings. In said drawings, which show, for illustrative purposes only, various forms of the invention:

FIG. 1 is an overall perspective view of a preferred twist gage of the invention, with a turbine vane applied thereto;

FIG. 1A is a perspective view of the vane of FIG. 1, to permit identification of elements thereof;

FIG. 2 is a view similar to FIG. 1, with the turbine vane removed;

Figure 3:
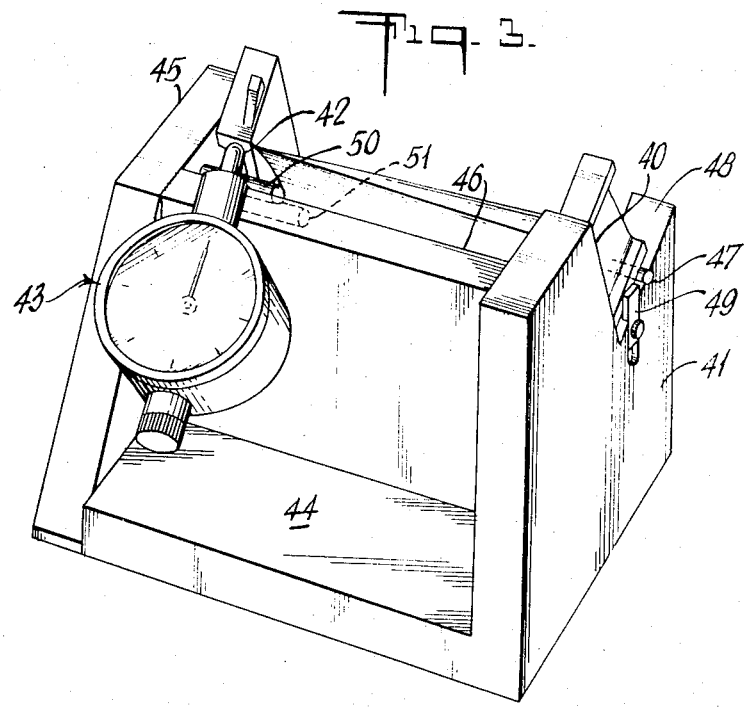
Figure 4:
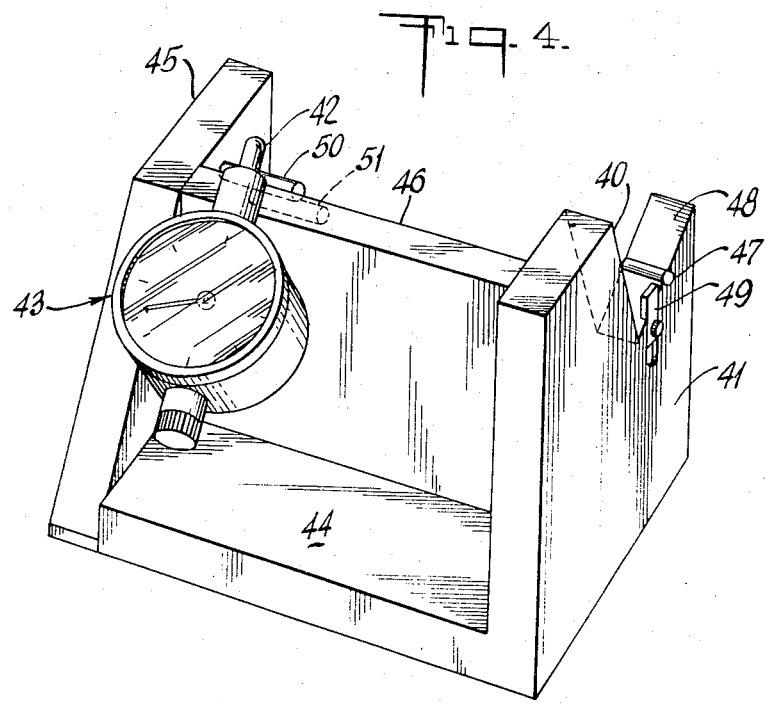
Figure 5:
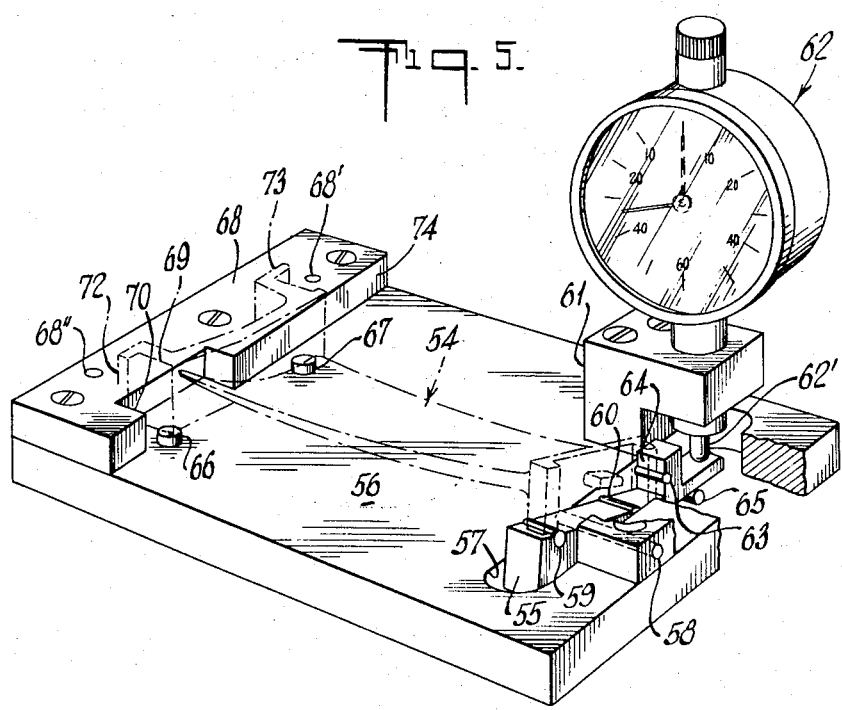
Figure 6:
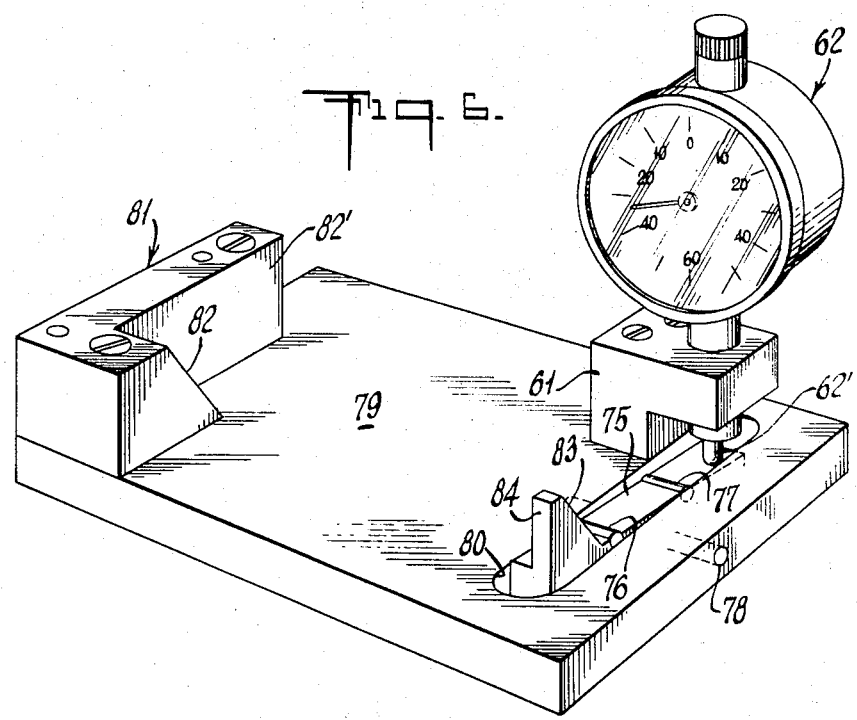

FIGS. 3 and 4 are views respectively similar to FIGS. 1 and 2 to illustrate another embodiment; and FIGS. 5 and 6 are views similar to FIG. 2 to illustrate a third and fourth embodiment, respectively.

Briefly stated, the invention contemplates a vane-twist measuring or gaging instrument in which the overall twist of the vane is assumed to be indicated by the angular relation between a reference alignment, taken on one buttress surface, and a measured-offset alignment, taken on the corresponding surface of the other buttress for the same vane. Basically, a reference plane is established for the reference surface of the first abutment, as by using two fixed and precisely positioned spaced point-contact elements, and a gage carried by the instrument near the other buttress senses the inclination of the other buttress (with respect to the reference plane) when the other buttress is applied against a single, or third, fixed point of support on the instrument. In one form, the third support point is established by an elongated bar, with provision for central pivotal support, so that its angular orientation about the pivot may reflect contact with, and therefore slope of, the other vane buttress; in another form, the third support point is a fixed abutment near one end of the other buttress, and a probe responds to a given location near the other of the buttress when the vane is applied to the three fixed support contacts.

Referring to FIGS. 1 and 2 of the drawings, the invention is shown in application to a twist-measuring or gaging instrument, for observing twist between the two buttresses 10–11 of a jet-engine nozzle vane 12 (see also FIG. 1A); the blade 13 of the vane is integral with the buttresses 10–11. Each of the buttresses includes opposed abutment surfaces or edges 14–15, extending between end surfaces 16–17. In the engine-assembly of such vanes, for a given engine stage, such a first-stage assembly using blades 12, corresponding abutment surfaces 14–15 (14'–15') of adjacent outer and inner buttresses are abutted to complete a circumferentially continuous succession, the assembly being retained by shroud means (not shown) located and locked as by retaining lugs 18–18' and slot 19, as will be understood.

The instrument comprises a flat rigid frame or base with support means at one end for one buttress and with separate support means at the other end, for the other buttress. As shown, the surface 14 of the outer buttress 10 is given reference-plane support, and twist is evaluated by observing slope of the corresponding surface 14' at the support for the inner buttress 11.

The instrument comprises a flat rigid base or frame 20 carrying the indicated support means. At the left end, the fixed plane of reference is established by spaced upstanding abutments, shown as hard pins 21–22 fixed to base 20 and conveniently ground to precisely the same elevation above the bottom face or plane of the base 20. The buttress surface 14 is engaged and positioned by the pins 21–22 at the reference plane. In similar fashion, at the other end, a third such pin 23 is fixed to base 20 and is ground off to determine a point of support near one end of the corresponding surface of buttress 11. These three points of support make for an unambiguous setting of the vane 12 via both buttresses thereof, so that a probe element or rocker arm 24 associated with a gage, such as an indicator 25, may detect vane twist by observing the elevation at a preselected location near the other end of the buttress surface 14'.

For assurance that each of a succession of vanes 12 will be positioned at precisely corresponding locations, the left support means includes an upstanding end abutment 26 for location of the buttress end 17, and an upstanding end abutment 27 for similar location of the buttress end 17'. The abutment 27 may be a bracket 28, bolted at 29 to base 20, and truncated along a surface 30 which is inclined in accordance with the slope of the end 17 of the buttress 10 to be accommodated. A hardened pin or rod insert 31, extends substantially parallel to the elongation axis 13 of the span of the blade 13 and is located centrally of the truncated surface 30, so that locating abutment for the end 17 is essentially a single point or line contact and is thus essentially independent of surface irregularities in the entire surface 17. Preferably, the truncation 30 extends short of the outer end of bracket 28, to provide more secure and unquestionably referenced location of the insert rod 31. The truncation 30 may be milled after drilling the bore for rod 31, and before force-fitting the rod 31 into its bore; and the plane of truncation preferably intersects the rod-support bore short of cutting the bore axis, thereby assuring continuous support of rod 31 along its entire length. In similar fashion, but at an appropriately offset location, an insert rod 31' in a truncated surface 30' of abutment 27 determines a single-contact reference location for the buttress end 17'. The final component of vane-positioning location may be determined by a single pin 32, fixed to base 20 and rising above the reference plane of pins 31–22, for edge contact with the recessed outer surface 10' of the buttress 10.

To recapitulate: the three pins 21–22–23 establish a fixed generally horizontal plane of orientation and, thus, a first component for stabilized location of vane 12. The two abutment rods 31–31' establish a fixed direction of the blade-elongation axis 13' (above said plane) and, thus, a second component for stabilized location of vane 12. Finally, the single pin 32 establishes a left-most location of the buttress 10, to determine the third component for location of vane 12 on the base 20. When the instrument is laid upon or secured to a horizontal table, it is a simple matter for an unskilled operator to apply and press each successive blade into the described abutment relation at 21–22–23–31–31'–32; in fact, the described placement is naturally adapted to a left-hand grasping of the vane, leaving the right hand free, to record observed indications.

In the form shown, the gage 25 is a conventional indicator, having a rotatable dial to permit a setting of zero, from which plus and minus abnormalities may be directly read through displacement of the indicator needle. The indicator 25 may include a rounded probe tip 33, spring-urged to extended position. The body of indicator 25 is secured to base 20 by a bracket 34, the bottom of which is grooved at 35 to accommodate movement of the rocker arm or lever 24 by which the indicator probe 33 tracks the other end of the buttress surface 14', i.e., the end opposite that which is fixedly referenced at 23. Arm 24 rocks about a pivot pin at 36. A bottom dowel 37 limits the extent to which it can be rocked in one direction, by the spring-loaded action of probe tip 33, and a rod or pin insert 38 projects sufficiently above the upper surface of arm 24 to establish a single contact with the buttress surface 14'.

Normally, before a vane is placed on the instrument, the resilient loading of tip 33 establishes a raised position of the buttress-tracking contact 38 (see FIG. 2, where the indicator needle is negatively offset from the zero position). Placement of the vane 12, as described, causes surface 14' to downwardly displace contact 38, thus driving the probe tip 33 upwardly. The extent of upward drive is indicated at 25, and this indication may involve quantitative display of departure from normal, if the dial at 25 is appropriately preset. Thus, the zero indication shown in FIG. 1 means a correct angular offset or slope of surface 14' with respect to surface 14, meaning a correct overall twist in the vane 12. And depending on the degree and direction of observed departure from this preset or "zero" condition, corrective measures must be taken in the hot-forming operation, before a vane can be considered acceptable.

In the instrument of FIGS. 3 and 4 (see FIG. 1A for buttress surfaces), the buttress surface 14 is fixedly referenced by an inclined flat surface or edge 40 formed in the upstanding side plate 41 of the bench-mountable instrument in which the probe tip 42 of an indicator 43 directly tracks the unsupported end of the surface 14' of the inner buttress. The frame comprises a rectangular base plate 44, to opposite ends of which the upstanding side walls or plates 41–45 are bolted; a central upstanding spacer plate 46 assures frame rigidity. The reference plane for surface 14 may be established at two spaced rod-insert contacts along the length of the inclined edge 40, but in the form shown the edge 40 directly locates surface 14. The adjacent end 17 may locate against a single-contact rod insert 47 in another edge 48 of plate 41, the inclination between edges 41–48 being appropriate to the particular buttress to be tested and observed. An edge locator or projection 49 defines a stop for right-ward limiting location of the outer edge of end 17.

At the left-hand end, in FIGS. 3 and 4, fixed parallel pins 50–51 carried by side plate 45 provide fixed bottoming reference for buttress end 17' and for the nearby buttress surface 14', and the fixed mounting of the body of gage 43 to side plate 45 is preferably such as to align the axis of probe 42 substantially perpendicular to the buttress surface 14'. Of course, the resiliently urged normally outward position of the probe tip 42 is such as to intercept the adjacent end of buttress surface 14', for the most extreme anticipated vane-warp condition.

In operation, the vane 12 is applied to the instrument, holding surface 14 against the reference-plane edge 40, with bottoming contact at 47–50–51, and with leftward limiting contact at 49. The probe tip displacement may read quantitatively, as departures from normal (zero preset) or as absolute magnitudes, if the gage indicator 43 is suitably calibrated.

The instrument of FIG. 5 makes twist-gage measurements on a second-stage vane (suggested by phantom outline 54) and resembles that of FIGS. 1 and 2 in several respects, but is differs by employing a rocker arm 55 at the means of both locating the adjacent vane buttress and of detecting the slope or warp thereof. The base plate 56 is slotted at 57 to accommodate pivoted movement of rocker arm 55 about its fixed pivot 58, and parallel rod inserts 59–60 are provided in the upper surface of arm 55 at positions astride the pivot axis to assure stabilized contact with the buttress surface (corresponding to 14' in FIG. 1A). A bracket 61 fixedly mounts the body of the indicator 62, so that the probe tip thereof may track the end of the rocker arm 55, in the manner described for arm 24 in FIGS. 1 and 2. As shown, the upper surface of arm 55 is characterized by a slope or ramp, and the far buttress end locates against a single contact rod 63, embedded in an upstanding wall 64, which makes with the down slope of the ramp an angle substantially matching that between the buttress end and abutment surfaces to be located thereon. A stop pin 65, carried by the base 56, limits downward rocking of arm 55 due to spring action within the probe tip 62' of indicator 62.

At the fixed or reference-plane end of the instrument, spaced fixed studs 66–67 are ground off to determine the reference plane for the abutment surface of the other buttress. An end bracket 68 is bolted to base plate 56 and rises above the ends of studs 66–67; locating dowels 68'–68" assure permanent angular reference of bracket 68 to the base plate 56. Bracket 68 is locally recessed at 69 to define an upstanding reference wall 70 for the left-buttress end, diagonally opposite the right-buttress end which locates at rod-insert 63.

In using the instrument of FIG. 5, the vane 54 is positioned in much the same manner as already described, except that the manual counterclockwise torque applied to the vane is relied upon to drive the inner-buttress end (16') and surface (14') firmly against abutment contacts 63–59–60 on the rocker arm 55. Final stability for the orientation of vane 54 is achieved when the end lugs or feet 72–73 of the outer buttress abut the surfaces 70–74, at which point there may be a slight clearance at 72–69, respectively. At this juncture, the reference-plane surface (14) at the outer buttress is held against pins 66–67, and the rocker arm 55 has assumed the slope of the inner-buttress surface (14'), so that the indicator reading can be noted.

In constructing the described instruments, the base plates, brackets and other elements which serve only for mounting, such as brackets 27–28–34–49–61 and the rocker arms, are conveniently made of flat ground low-carbon steel. On the other hand, the abutment elements, such as insert rods, positioning studs and pins, and abutment brackets (e.g., at 68) are made of tool steel, hardened for example to Rockwell C 58–60.

FIG. 6 illustrates a further embodiment, suitable for making twist observations on a vane of the type shown in FIG. 1A. A rocker arm 75 employs hard pin inserts 76–77 as single-point contacts (for surface 14') on opposite sides of the pivot pin 78. The tail end of arm 75 is tracked by the probe tip of the indicator, which may be mounted and constructed as in FIG. 5 and which is therefore given the same reference numbers. As also shown in FIG. 5, the base 79 is slotted (at 80) to accommodate the rocker arm (75), and bracket means 81 is mounted at the other end of the base, to locate the outer buttress (10). As shown, bracket means 81 is L-shaped, with an inclined ramp 82 against which to reference the sloping end surface 17. A similar slope 83 on an upstanding end 84 of the rocker arm 75 similarly serves the corresponding end surface (17') of the inner buttress.

In FIG. 6, simplicity is achieved by making the base 79 and the bracket 81 of tool steel, thereby reducing the number of hardened inserts. In use, the vane 12 is applied to lay surface 14 flat on base 79 and urged leftward and forward into limiting contact with the inside corner walls 82–82' of the L bracket 81. The inner buttress is pressed to align the contacts 76–77 with surface 14', while drawing end surface 17' against the slope 83. At this point, the indicator 62 is read, for possible departure from normal (zero).

The described constructions have been found to reliably measure buttress twist (i.e., overall vane twist) on individual vanes that are reconditioned, straightened or rebuilt. These constructions meet the stated objects and have reliably served in hundreds of thousands of gaging operations, without noticeable wear. The products which successfully pass the instrument have demonstrated at least as great performance capability as do newly manufactured, unused original products. All testing and gaging can be readily performed by relatively unskilled personnel, on a "go : no–go" basis for each observed vane.

While the invention has been described in detail for the forms shown, it will be understood that modifications and adaptations may be made without departure from the scope of the invention.

What is claimed is:

1. Gage means for observing buttress-to-buttress twist in an applied turbine vane having a span extending between integral outer and inner buttresses, each of said buttresses having opposed substantially flat elongated abutment surfaces for nested abutment with corresponding adjacent surfaces of the next adjacent vane when in shrouded assembly about a turbine axis, said buttresses also having opposed substantially flat end surfaces which align in spaced axial-end planes when in shrouded assembly, said gage means comprising a rigid frame with outer-buttress support means spaced from inner-buttress support means for supporting the turbine vane only at the outer and inner buttresses thereof; one of said support means comprising first fixed reference abutment means adapted to engage one buttress and to locate the same against rotation with respect to the vane-span elongation axis, fixed axial-locating means operative to axially contact a buttress and thus axially locate the vane against movement at least in one direction of the vane-span elongation axis, the other of said support means comprising further fixed reference abutment means adapted to engage one of the abutment surfaces of the other buttress at one location along said one other-buttress surface, and at a location along an adjacent flat end surface of said other buttress said further reference abutment means having a convex buttress-contacting surface that is arcuate about an axis substantially parallel to the vane-span elongation axis, and a frame-mounted probe offset from said arcuate surface and positioned for yieldably movable contact with an abutment surface if said other buttress when the applied vane is fixedly abutted to said first and further fixed abutment means.

2. Gage means according to claim 1, in which said probe comprises a mechanical-displacement indicator having a body fixed to said frame and probe-element means including an element poised for substantially single-contact engagement with part of an applied vane buttress.

3. Gage means according to claim 1, in which said further fixed reference abutment means comprises two spaced fixed cylindrical rods on axes that are substantially parallel to the vane-span elongation axis.

4. Gage means according to claim 1, in which said fixed axial locating means is part of said rigid frame.

5. Gage means for observing buttress-to-buttress twist in an applied turbine vane having a span extending between integral outer and inner buttresses, each of said buttresses having opposed substantially flat elongated abutment surfaces for nested abutment with corresponding adjacent surfaces of the next adjacent vane when in shrouded assembly about a turbine axis, said buttresses also having opposed substantially flat end surfaces which align in spaced axial-end planes when in shrouded assembly, said gage means comprising a rigid frame with outer-buttress support means spaced from inner-buttress support means for supporting the turbine vane only at the outer and inner buttresses thereof; one of said support means comprising first fixed reference abutment means adapted to engage one buttress and to locate the same against rotation with respect to the vane-span elongation axis, fixed axial-locating means operative to axially contact a buttress and thus axially locate the vane against movement at least in one direction of the vane-span elongation axis, the other of said support means comprising further fixed reference abutment means adapted to support one of the abutment surfaces of the other buttress at one location along said one other-buttress surface and at a location along an adjacent flat end surface of said other buttress, said further fixed reference abutment means comprising two spaced fixed cylindrical rods on axes that are substantially parallel to the vane-span elongation axis, said rods being adapted to engage and support said other buttress at said respective locations, and a frame-mounted probe offset from said arcuate surfaces and positioned for yieldably movable contact with an abutment surface of said other buttress when the applied vane is fixedly abutted to said first and further fixed abutment means.

* * * * *